(12) United States Patent
Song (10) Patent No.: US 10,339,461 B2
(45) Date of Patent: Jul. 2, 2019

(54) SYSTEM FOR MAINTENANCE OF A MANUFACTURED PRODUCT

(71) Applicant: THE BOEING COMPANY, Huntington Beach, CA (US)

(72) Inventor: Shuguang Song, Seattle, WA (US)

(73) Assignee: The Boeing Company, Chicago, IL (US)

( * ) Notice: Subject to any disclaimer, the term of this patent is extended or adjusted under 35 U.S.C. 154(b) by 752 days.

(21) Appl. No.: 14/871,197

(22) Filed: Sep. 30, 2015

(65) Prior Publication Data

US 2017/0091640 A1    Mar. 30, 2017

(51) Int. Cl.
| | |
|---|---|
| *G06N 5/02* | (2006.01) |
| *G06N 7/00* | (2006.01) |
| *G05B 23/02* | (2006.01) |
| *G06Q 10/04* | (2012.01) |

(52) U.S. Cl.
CPC ......... *G06N 7/005* (2013.01); *G05B 23/0283* (2013.01); *G06Q 10/04* (2013.01); *G06N 5/02* (2013.01)

(58) Field of Classification Search
None
See application file for complete search history.

(56) References Cited

U.S. PATENT DOCUMENTS

| | | |
|---|---|---|
| 5,822,218 A | 10/1998 | Moose et al. |
| 2002/0128728 A1 | 9/2002 | Murakami et al. |
| 2007/0112608 A1 | 5/2007 | Avery et al. |
| 2009/0265118 A1 | 10/2009 | Guenther et al. |
| 2010/0262442 A1 | 10/2010 | Wingenter |
| 2014/0025363 A1 | 1/2014 | Zou et al. |

(Continued)

FOREIGN PATENT DOCUMENTS

| | | |
|---|---|---|
| DE | 10235525 A1 | 4/2003 |
| EP | 1577721 A2 | 9/2005 |

(Continued)

OTHER PUBLICATIONS

Pickett, Model calibration: Composite Global Ply model 131 for elastic, damage and failure, Institute for Aircraft Design, Stuttgart, Sep. 2012, pp. 1-17.*

(Continued)

*Primary Examiner* — Wilbert L Starks
(74) *Attorney, Agent, or Firm* — Womble Bond Dickinson (US) LLP (57) ABSTRACT

A system is provided for maintenance of a manufactured product composed of a plurality of parts. A modeling engine may receive failure data for the plurality of parts in which the failure data indicates individual instances of failure of at least two of a multiple quantity of a part of the plurality of parts. Each of the at least two of the multiple quantity may be located at a respective distinct location in the manufactured product. The modeling engine may generate a superimposed failure model (SFM) for the part, including determining a lifetime distribution of the part based at least partially on application of a lifetime distribution model to the SFM. A maintenance engine coupled to the modeling engine may perform a maintenance activity including determining a maintenance interval determined for the part according to the lifetime distribution of the part.

18 Claims, 3 Drawing Sheets

(56) References Cited

U.S. PATENT DOCUMENTS

2014/0372289 A1   12/2014  Doom et al.
2015/0105968 A1   4/2015   Ho

FOREIGN PATENT DOCUMENTS

| EP | 2557530 A1 | 2/2013 |
|---|---|---|
| WO | 2011080548 A1 | 7/2011 |
| WO | 2012157040 A1 | 11/2012 |
| WO | 2015008155 A2 | 1/2015 |
| WO | 2015132687 A1 | 9/2015 |

OTHER PUBLICATIONS

Bezensek, Elastic-plastic crack problems in the ductile-brittle transition, Doctoral Thesis, University of Glasgow, 2003, pp. 1-455 (Year: 2003).*
Virginie Rondeau et al., "Frailtypack: A Computer Program for the Analysis of Correlated Failure Time Data Using Penalized Likelihood Estimation", HAL Author Manuscript, pp. 1-37.
D.R. Cox, "Regression Models and Life-Tables", Journal of the Royal Statistical Society. Series B (Methodological), vol. 34, No. 2, 1972, pp. 187-220.
International Search Report dated Jan. 16, 2017 for Application No. 16185781.8.

\* cited by examiner

SYSTEM FOR MAINTENANCE OF A MANUFACTURED PRODUCT

TECHNOLOGICAL FIELD

The present disclosure relates generally to maintenance of a manufactured product and, in particular, to determining a desired maintenance interval for a part on the manufactured product.

BACKGROUND

Regularly-scheduled maintenance of an aircraft and other similar manufactured products has both operational and economic impacts on the daily business affairs of the overall aircraft fleet. It is important to precisely determine desired times or intervals for performing maintenance tasks to efficiently run an airline.

A lifetime distribution model may be utilized to provide a statistical lifetime of the parts on a manufactured product, and therefore enable a means to better determine a time frame in which maintenance should be performed on any given part. During the manufacture of a large-scale product such as an aircraft, one part in particular may be used in multiple locations throughout the aircraft.

In particular, the lifetime distribution model only traditionally accounts for a first instance of failure of the part. As such, the overall lifetime derived for the part does not reflect multiple instances of failure of the part on the manufactured product. This often results in an overly conservative estimate regarding the true underlying lifetime of the part. Therefore a need exist to provide a more accurate estimate of the true lifetime distribution of a part such that, as a result, maintenance intervals may be more accurately determined for the part.

BRIEF SUMMARY

Example implementations of the present disclosure are directed to an improved system, method and computer-readable storage medium for performing maintenance of a manufactured product composed of a plurality of parts including a multiple quantity of a part of the plurality of parts. The present disclosure includes, without limitation, the following example implementations.

In some example implementations, a method is provided for maintenance of a manufactured product composed of a plurality of parts including a multiple quantity of a part of the plurality of parts. The method may comprise receiving failure data for the plurality of parts in which the failure data indicates individual instances of failure of at least two of the multiple quantity of the part, each of the at least two of the multiple quantity being located at a respective distinct location in the manufactured product. The method may also comprise generating a superimposed failure model (SFM) for the part based at least partially on the failure data, including determining a lifetime distribution of the part based at least partially on application of a lifetime distribution model to the SFM. The method may also comprise performing a maintenance activity for the part, including determining a maintenance interval for the part according to the lifetime distribution of the part.

In some example implementations of the method of the preceding or any subsequent example implementation, or any combination thereof, generating the SFM includes identifying an observed failure time for each of the individual instances of failure of the at least two of the multiple quantity of the part, and generating the SFM according to the following:

$$S(t) \cdot \left[ \sum_{m=1}^{i-1} \left( \frac{S\left(t + \sum_{k=1}^{m} T_{i-k}\right)}{S\left(\sum_{k=1}^{m} T_{i-k}\right)} \right) \cdot P\left(X > \sum_{k=1}^{m} T_{i-k} \middle| T_1, \ldots, T_{i-1}\right) \right]^{n-1}$$

where t represents a given time, n represents the multiple quantity of the part, i represents an index for a sequence of observed failure times, x represents a given variable lifetime, S represents a survival function, $T_i$ represents an observed time interval between at least two observed failure times, and F(x) represents a distribution function of the part that indicates a probability that a lifetime of the part is less than x, and wherein the modeling engine being configured to generate the SFM includes being configured to calculate $$P\left(X > \sum_{k=1}^{m} T_{i-k} \middle| T_1, \ldots, T_{i-1}\right) \text{ according to: } F(T_1 + T_2 + \ldots + T_{i-m-1}) -$$

$$S(T_{i-m-1}) P\left(X \text{ fails at } \sum_{l=1}^{i-m-2} T_l \middle| T_1, \ldots, T_{i-1}\right) -$$

$$S(T_{i-m-1} + T_{i-m-2}) P\left(X \text{ fails at } \sum_{l=1}^{i-m-3} T_l \middle| T_1, \ldots, T_{i-1}\right) -$$

$$\ldots - S(T_2 + T_3 + \ldots + T_{i-m-1}) F(T_1)$$

In some example implementations of the method of any preceding or any subsequent example implementation, or any combination thereof, generating the SFM includes calculating $T_i$ according to:

$$T_i = \min(X, R_1, \ldots, R_{n-1}),$$

where X represents a random lifetime of the part, and R represents a corresponding residual lifetime of the part at each respective distinct location.

In some example implementations of the method of any preceding or any subsequent example implementation, or any combination thereof, $$\frac{S(t+x)}{S(x)}$$

represents the lifetime distribution model, and application of the lifetime distribution model to the SFM includes application of an exponential distribution model according to the following:

$$\frac{S(t+x)}{S(x)} = \frac{e^{-\lambda(t+x)}}{e^{-\lambda x}}$$

where $\lambda$ represents a constant failure rate at any distinct failure time (t).

In some example implementations of the method of any preceding or any subsequent example implementation, or any combination thereof, $$\frac{S(t+x)}{S(x)}$$

represents the lifetime distribution model, and application of the lifetime distribution model to the SFM includes application of a Weibull distribution model according to the following:

$$\frac{S(t+x)}{S(x)} = \frac{e^{-[(t+x)/\alpha]^\beta}}{e^{-(x/\alpha)^\beta}}$$

where $\alpha$ and $\beta$ represent respectively a scale parameter and a shape parameter.

In some example implementations of the method of any preceding or any subsequent example implementation, or any combination thereof, the method further comprises generating a scale parameter or shape parameter utilizing the lifetime distribution model, and determining upper and lower bounds of the lifetime distribution of the part based at least partially on the scale parameter or shape parameter, the maintenance interval being based at least partially on the upper and lower bounds of the lifetime distribution of the part.

In some example implementations of the method of any preceding or any subsequent example implementation, or any combination thereof, the method further comprises automatically removing or replacing the part based at least partially on the maintenance interval determined for the part; and communicating the schedule to a user.

In some example implementations, a system is provided for maintenance of a manufactured product. The system may include implementation of subsystems, such as data collection, modeling and maintenance engines, configured to perform steps of the method.

In some example implementations, a computer-readable storage medium is provided for maintenance of a manufactured product. The computer-readable storage medium is non-transitory and has computer-readable program code portions stored therein that, in response to execution by a processor, cause an apparatus to at least perform the method of any preceding example implementation, or any combination thereof.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as intended, namely to be combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference to something as being a first, second or the like should not be construed to imply a particular order. Also, for example, reference may be made herein to quantitative measures, values, relationships or the like. Unless otherwise stated, any one or more if not all of these may be absolute or approximate to account for acceptable variations that may occur, such as those due to engineering tolerances or the like. Like reference numerals refer to like elements throughout.

Example implementations of the present disclosure are generally directed to maintenance of a manufactured product and, in particular, to determining a maintenance interval for a part on the manufactured product. Example implementations will be primarily described in conjunction with aerospace applications in which the manufactured product may be an aircraft or one or more component parts of an aircraft, such as one or more materials, components, assemblies and sub-assemblies of an aircraft. It should be understood, however, that example embodiments may be utilized in conjunction with a variety of other applications, both in the aerospace industry and outside of the aerospace industry. In this regard, example embodiments may be utilized on conjunction with complex systems, vehicles or the like, such as in the case of aerospace, automotive, marine and electronics. Access to accurate and consistent failure data is important because it can impact multiple aspects of equipment operations, including safety, operations, maintenance, engineering support and the like.

Figure 1:
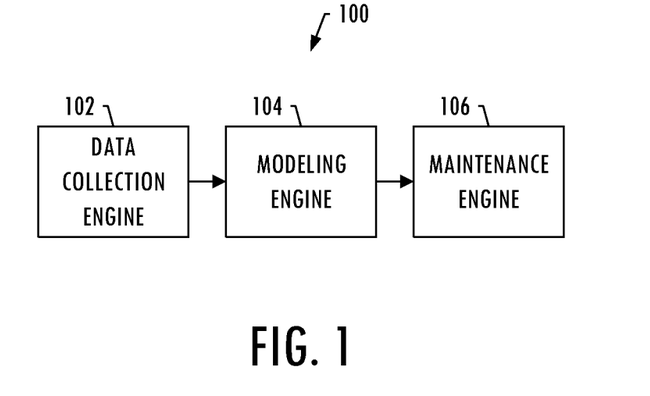
FIG. 1 is an illustration of a system for maintenance of a manufactured product according to example implementations of the present disclosure.

FIG. 1 illustrates a system for maintenance of a manufactured product 100 according to example implementations of the present disclosure, which may be simply referred to as the "maintenance system" herein. The maintenance system may be configured to perform a number of different functions or operations, either automatically, under direct operator control, or some combination of thereof. In this regard, the maintenance system may be configured to perform one or more of its functions or operations automatically, that is, without being directly controlled by an operator. Additionally or alternatively, the maintenance system may be configured to perform one or more of its functions or operations under direct operator control.

The maintenance system 100 may include one or more of each of a number of different subsystems (each an individual system) coupled to one another for performing one or more functions or operations. As shown in FIG. 1, for example, the maintenance system may include a data collection engine 102, modeling engine 104 and/or maintenance engine 106 that may be coupled to one another. Although shown as part of the maintenance system, one or more of the data collection engine 102, modeling engine 104 and/or maintenance engine 106 may instead be separate from but in communication with the maintenance system. It should also be understood that one or more of the subsystems may function or operate as a separate system without regard to others of the subsystems. And further, it should be understood that the maintenance system may include one or more additional or alternative subsystems than those shown in FIG. 1.

The maintenance system 100 may be generally configured to facilitate maintenance of a manufactured product composed of a plurality of parts including a multiple quantity of a part of the plurality of parts. For example, a manufactured product such as a helicopter may utilize three (3) pumps including a forward pump, an after pump, and a utility pump such that the quantity of pumps per aircraft is equivalent to three (3). In instances in which the maintenance data of the helicopter pumps does not include the position of the pump associated with each instance of observed pump failure, the maintenance system may determine the maintenance interval for the pumps, collectively.

As explained in greater detail below, the data collection engine 102 may be generally configured to receive failure data for the plurality of parts. The failure data may indicate individual instances of failure of at least two of the multiple quantity of the part. As described herein, failure data may relate to one or more failures in a complex system. As described herein, a failure may refer to a malfunction, degradation or failure. For each of one or more failure cases in the complex system, the failure data may identify or describe (the terms being synonymous herein, and at times generally referred to as "identify") a system-level failure, and in various instances, one or more effects of the system-level failure.

The failure data may relate to one or more failures in a manufactured product such as an aircraft. A manufactured product may be generally composed of one or more components, subsystems or the like (each generally referred to as a "subsystem"), with each subsystem being composed of one or more parts, and each part including one or more features. In this regard, the parts of the manufactured product may be assembled into a number of subsystems, which in turn may be assembled into the manufactured product. In the context of an aircraft, one or more parts or subsystems may be designed as a modular component of the aircraft often referred to as a line-replaceable unit (LRU), of which a single aircraft may include a number of LRUs and other parts or subsystems. For a manufactured product, any of its subsystems, parts (of subsystems), features (of parts) or the like may at times be generally referred to as a "part" of the manufactured product.

Each of the at least two of the multiple quantity may be located at a respective distinct location in the manufactured product. The modeling engine 104 may be generally configured to generate a superimposed failure model (SFM) for the multiple quantity of the part based at least partially on the failure data. The modeling engine may be further configured to determine a lifetime distribution of the part based at least partially on application of a lifetime distribution model to the SFM. The maintenance engine 106 may be generally configured to perform a maintenance activity for the part including determining a maintenance interval for the part according to the lifetime distribution model of the part.

As previously indicated, the data collection engine 102 may be configured to receive failure data for the plurality of parts. The failure data may indicate individual instances of failure of at least two of the multiple quantity of the part. Each of the at least two of the multiple quantity may be located at a respective distinct location in the manufactured product. The data collection engine may be configured to provide data to the modeling engine 104 for use in generating a SFM.

In some example implementations, the data collection engine 102 may be configured to receive failure data. The data collection engine may be configured to receive the failure data from any of a number of different sources, and which may be formatted in any of a number of different manners. For example, the data collection engine may be configured to receive failure data for one or more failure cases directly from an operator such as through data entry techniques. In another example, the data collection engine may be configured to receive failure data directly from a failing manufactured product, which may be equipped with one or more sensors or embedded systems configured to transmit a signal in the event it or one of its systems experiences a failure. In yet another example, the data collection engine may be configured to receive failure data from suitable storage such as file storage, database storage, cloud storage or the like.

As or after the data collection engine 102 receives failure data, the data collection engine may be configured to communicate the failure data to storage for later retrieval. The storage may be resident with the data collection engine, or may be separate from and in communication with the data collection engine. The failure data may be formatted and stored in any of a number of different manners, and hence, their storage may be of any of a number of different types. Examples of suitable types of storage include file storage, database storage, cloud storage or the like.

The modeling engine 104 may be configured to generate a SFM for the multiple quantity of the part based at least partially on the failure data. The modeling engine 104 may be further configured to determine a lifetime distribution of the part based at least partially on application of a lifetime distribution model to the SFM. The modeling engine 104 may be coupled to the data collection engine 102 and/or the maintenance engine 106. The modeling engine 104 may be configured to receive failure data from the data collection engine for use in generating the SFM.

In some example implementations, the modeling engine 104 may be configured to identify an observed failure time for each of the individual instances of failure of the at least two of the multiple quantity of the part.

In such an implementation, the modeling engine 104 may be initially configured to calculate the following, for the generation of the SFM model:

$$P(T_i > t) =$$

$$P(\min(X_1, X_2, \ldots, X_n) > t) = \prod_{i=1}^{n} P(X_i > t) = [1 - F(t)]^n \equiv [S(t)]^n$$

$$P(T_2 > t \mid T_i) =$$

$$P(\min(X, R_1, \ldots, R_{n-1}) > t \mid T_i) = P(X > t) \cdot \prod_{j=1}^{n-1} P(R_j > t \mid T_i)$$

$$= S(t) \cdot \prod_{j=1}^{n-1} P(R_j > t \mid X_j > T_1)$$

$$= S(t) \cdot \left[\frac{S(t + T_1)}{S(T_1)}\right]^{n-1}$$

In some example implementations, the modeling engine 104 may be configured to generate the SFM according to the following:

$$P(T_i > t \mid T_i, \ldots, T_{i-1}) = P(\min(X, R_1, \ldots, R_{n-1})$$
$$> t \mid T_i, \ldots, T_{i-1})$$

$$= P(X > t) \cdot \prod_{j=1}^{n-1} P(R_j > t \mid T_i, \ldots, T_{i-1})$$

$$= S(t) \cdot \prod_{j=1}^{n-1} \left[\sum_{m=1}^{i=1} P\left(R_j > t \mid X_j > \sum_{k=1}^{m} T_{i-k}, T_1, \ldots, T_{i-1}\right) \right.$$

$$\left. P\left(X_j > \sum_{k=1}^{m} T_{i-k} \mid T_1, \ldots, T_{i-1}\right)\right]$$

$$= S(t) \cdot \prod_{j=1}^{n-1} \left[\sum_{m=1}^{i=1} \frac{S\left(t + \sum_{k=1}^{m} T_{i-k}\right)}{S\left(\sum_{k=1}^{m} T_{i-k}\right)} \cdot P\left(X_j > \sum_{k=1}^{m} T_{i-k} \mid T_1, \ldots, T_{i-1}\right)\right]$$

$$= S(t) \cdot \left[\sum_{m=1}^{i-1} \frac{S\left(t + \sum_{k=1}^{m} T_{i-k}\right)}{S\left(\sum_{k=1}^{m} T_{i-k}\right)} \cdot P\left(X > \sum_{k=1}^{m} T_{i-k} \mid T_1, \ldots, T_{i-1}\right)\right]^{n-1}$$

where i=3, . . . , N.

In such an implementation, t may represent a given time, n may represent the quantity of the multiple quantity of the part, i may represent an index for a sequence of observed failure times, x may represent a given variable lifetime, S may represent a survival function, $T_i$ may represent an observed time interval between at least two observed failure times, and F(x) may represent a distribution function of the part that indicates a probability that a lifetime of the part is less than x.

In some example implementations, the modeling engine 104 may be configured to calculate $$P\left(X > \sum_{k=1}^{m} T_{i-k} \mid T_1, \ldots, T_{i-1}\right) \text{ according to the following:}$$

$$= P\left(X_j > \sum_{k=1}^{m} T_{i-k} \mid T_1, \ldots, T_{i-1}\right) = \left(X_j \text{ fails at } \sum_{l=1}^{i-m-1} T_l \mid T_1, \ldots, T_{i-1}\right),$$

$$= F(T_1 + T_2 + \ldots + T_{i-m-1}) -$$

$$S(T_{i-m-1}) P\left(X \text{ fails at } \sum_{l=1}^{i-m-2} T_l \mid T_1, \ldots, T_{i-1}\right) -$$

$$S(T_{i-m-1} + T_{i-m-2}) P\left(X \text{ fails at } \sum_{l=1}^{i-m-3} T_l \mid T_1, \ldots, T_{i-1}\right) -$$

$$\ldots - S(T_2 + T_3 + \ldots + T_{i-m-1}) F(T_1)$$

where m=1, . . . , i−1. In such an implementation, $X_j$ is the lifetime of the part since last failure time at the jth location, $$P\left(X > \sum_{k=1}^{m} T_{i-k} \mid T_1, \ldots, T_{i-1}\right)$$

is the probability conditional on $T_1, \ldots, T_{i-1}$ that the part at the jth location fails last time at observed time $$\sum_{k=1}^{m} T_k \text{ for } m = 1, \ldots i = 1 \text{ and } T_0 \equiv 0.$$

In some example implementations, the modeling engine 104 may be configured to calculate $T_i$ according to:

$$T_i = \min(X, R_1, \ldots, R_{n-1}),$$

In such an implementation, X may represent a random lifetime of the multiple quantity of the part, and R may represent a corresponding residual lifetime of the multiple quantity of the part at each respective distinct location.

In some example implementations, notation $$\frac{S(t + x)}{S(x)}$$

may represent the lifetime distribution model, and application of the lifetime distribution model to the SFM may include application of an exponential distribution model according to the following:

$$\frac{S(t + x)}{S(x)} = \frac{e^{-\lambda(t+x)}}{e^{-\lambda x}},$$

in which $F(t)=1-e^{-\lambda t}$ for $0<t<\infty$. In such an implementation, λ may represent a constant failure rate at any observed failure time.

In another example implementations, application of the lifetime distribution model to the SFM may include application of a Weibull distribution model according to the following:

$$\frac{S(t+x)}{S(x)} = \frac{e^{-[(t+x)/\alpha]^\beta}}{e^{-(x/\alpha)^\beta}},$$

in which $F(t)=1-e^{-(t/\alpha)^\beta}$ for $0<t<\infty$. In such an implementation $\alpha$ and $\beta$ may represent respectively a scale parameter and a shape parameter.

In some example implementations, the modeling engine 104 may be further configured to generate a scale parameter or shape parameter utilizing the lifetime distribution model, and determine upper and lower bounds of the lifetime distribution of the part based at least partially on the scale parameter or shape parameter.

In one implementation, for example, the quantity of a part per manufactured product is equivalent to n such that the part is used independently at n different locations. Accordingly, $X_1, X_2, \ldots, X_n$ may be the failure times of the part at n locations in which the failures times independently follow the same distribution function. $R_1, R_2, \ldots, R_n$ may be the corresponding residual lifetime of the part at each location. In some implementations, the modeling engine 104 may assume no ties in the observed failure times from the n locations. Each observed failure time in the failure data may be associated with only one of the n locations. $T_1, T_2, \ldots, T_n$ may be the inter-failure times of the observed failure time (e.g., a duration of time between the observed failure times).

In one implementation, the modeling engine 104 may calculate $T_1$ and $T_i$ according to the following:

$$T_1 = \min(X_1, X_2, \ldots X_n),$$

$$T_i = \min(X, R_1, \ldots, R_{n-1}).$$

In such an implementation $i=2, \ldots, N$. X may be the lifetime of the part at the location since last failure which may follow the same distribution as $X_1, X_2, \ldots, X_n$. $R_i$ may denote the residual lifetime of the part at the other n−1 locations since their last failures.

The maintenance engine 106 may be configured to perform a maintenance activity for the part, including determination of a maintenance interval for the part according to the lifetime distribution of the part. In some examples, the maintenance interval may be either received from the modeling engine 104 or determined based at least partially on data received from the modeling engine 104. In some example implementations, the maintenance interval may be based at least partially on the upper and lower bounds of the lifetime distribution of the part.

In some example implementations, maintenance of a physical instance of the manufactured product may be performed at the determined maintenance interval, or at a maintenance interval determined from the maintenance interval. For example, maintenance of the manufactured product may include working (e.g., repair or replacement) of the part at its various locations. As such, maintenance of the manufactured product may be performed according to a schedule determined based at least partially on the maintenance interval determined for the part according to the lifetime distribution of the part. In some example implementations, the maintenance engine may be configured to automatically schedule the part for removal and/or replacement based at least partially on the maintenance interval determined for the part, and further communicate the schedule to a user. Accordingly, in some example implementations, a method may comprises automatically removing or replacing the part based at least partially on the maintenance interval determined for the part.

Figure 2:
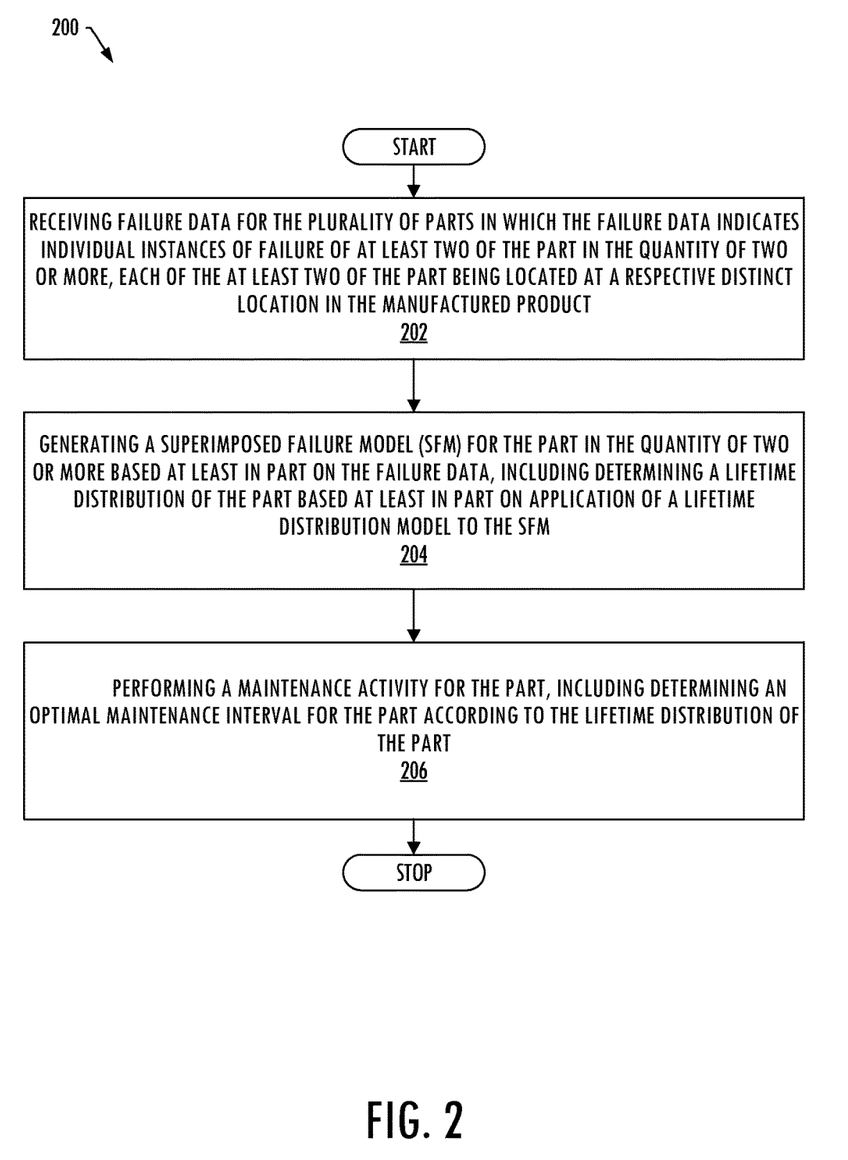
FIG. 2 is a flow diagram illustrating various operations of a method of maintenance of a manufactured product, in accordance with an example implementation.

FIG. 2 illustrates a flowchart including various operations of a method 200 for maintenance of a manufactured product composed of a plurality of parts including a multiple quantity of a part of the plurality of parts, in accordance with an example implementation of the present disclosure. As shown at block 202, the method may include receiving failure data for the plurality of parts in which the failure data indicates individual instances of failure of at least two of the multiple quantity of the part. Each of the at least two of the multiple quantity being located at a respective distinct location in the manufactured product. The method may include generating a superimposed failure model (SFM) for the multiple quantity of the part based at least partially on the failure data, including determining a lifetime distribution of the part based at least partially on application of a lifetime distribution model to the SFM, as shown at block 204. The method may also include performing a maintenance activity for the part including determining a maintenance interval for the part according to the lifetime distribution of the part, as shown in block 206.

According to example implementations of the present disclosure, the system 100 and its subsystems and/or components including the data collection engine 102, modeling engine 104, and/or maintenance engine 106 may be implemented by various means. Similarly, the example data collection engine including each of its respective elements may be implemented by various means according to example implementations. Means for implementing the systems, subsystems and their respective elements may include hardware, alone or under direction of one or more computer programs from a computer-readable storage medium.

In some examples, one or more apparatuses may be provided that are configured to function as or otherwise implement the systems, subsystems, tools and respective elements shown and described herein. In examples involving more than one apparatus, the respective apparatuses may be connected to or otherwise in communication with one another in a number of different manners, such as directly or indirectly via a wired or wireless network or the like.

Figure 3:
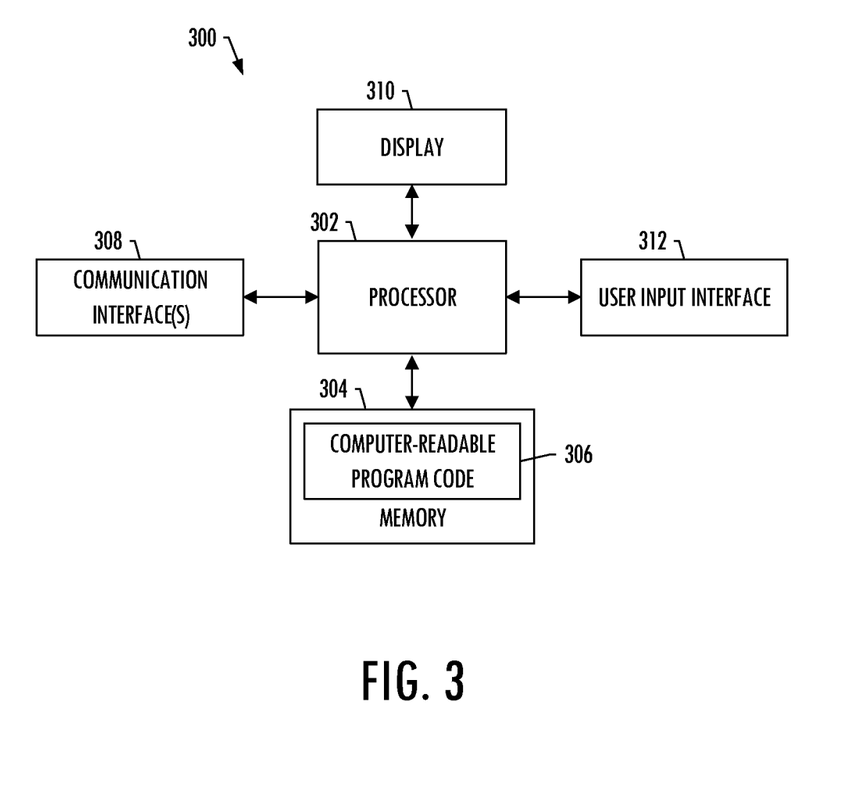
FIG. 3 illustrates an apparatus according to some example implementations.

FIG. 3 illustrates an apparatus 300 according to some example implementations of the present disclosure. Generally, an apparatus of example implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor 302 (e.g., processor unit) connected to a memory 304 (e.g., storage device).

The processor 302 is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 304 (of the same or another apparatus).

The processor 302 may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory 304 is generally any piece of computer hardware that is capable of storing information such as, for example, data, computer programs (e.g., computer-readable program code 306) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for displaying, transmitting and/or receiving information. The interfaces may include a communications interface 308 (e.g., communications unit) and/or one or more user interfaces. The communications interface 308 may be configured to transmit and/or receive information, such as to and/or from other apparatus(es), network(s) or the like. The communications interface 308 may be configured to transmit and/or receive information by physical (wired) and/or wireless communications links. Examples of suitable communication interfaces 308 include a network interface controller (NIC), wireless NIC (WNIC) or the like.

The user interfaces may include a display 310 and/or one or more user input interfaces 312 (e.g., input/output unit). The display may be configured to present or otherwise display information to a user, suitable examples of which include a liquid crystal display (LCD), light-emitting diode display (LED), plasma display panel (PDP) or the like.

The user input interfaces 312 may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 300 may include a processor 302 and a computer-readable storage medium or memory 304 coupled to the processor, where the processor is configured to execute computer-readable program code 306 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for implementation of a system for maintenance of a manufactured product composed of a plurality of physical parts including a multiple quantity of a physical part of the plurality of physical parts, the apparatus including a processor and a memory storing executable instructions that, in response to execution by the processor, cause the apparatus to implement at least:
   a data collection engine configured to receive failure data for the plurality of physical parts in which the failure data indicates individual instances of failure of at least two of the multiple quantity of the physical part, each of the at least two of the multiple quantity being located at a respective distinct location in the manufactured product;
   a modeling engine configured to generate a superimposed failure model (SFM) for the physical part based at least partially on the failure data, including the modeling engine being configured to determine a lifetime distribution of the physical part based at least partially on application of a lifetime distribution model to the SFM; and
   a maintenance engine coupled to the modeling engine and configured to perform a maintenance activity for the physical part, including the maintenance engine being configured to determine a maintenance interval for the physical part according to the lifetime distribution of the physical part, wherein the maintenance engine is further configured to automatically schedule the physical part for removal or replacement based at least partially on the maintenance interval determined for the physical part; and communicate the schedule to a user.

2. The apparatus of claim 1, wherein the modeling engine being configured to generate the SFM includes being configured to:
   identify an observed failure time for each of the individual instances of failure of the at least two of the multiple quantity of the physical part; and
   generate the SFM according to the following:

$$S(t) \cdot \left[ \sum_{m=1}^{i-1} \left( \frac{S\left(t + \sum_{k=1}^{m} T_{i-k}\right)}{S\left(\sum_{k=1}^{m} T_{i-k}\right)} \cdot P\left(X > \sum_{k=1}^{m} T_{i-k} | T_1, \ldots, T_{i-1}\right) \right) \right]^{n-1}$$

wherein t represents a given time, n represents the multiple quantity of the physical part, i represents an index for a sequence of observed failure times, x represents a given variable lifetime, S represents a survival function, $T_i$ represents an observed time interval between at least two observed failure times, and F(x) represents a distribution function of the physical part that indicates a probability that a lifetime of the physical part is less than x, and wherein the modeling engine being configured to generate the SFM includes being configured to calculate $$P\left(X > \sum_{k=1}^{m} T_{i-k} \bigg| T_1, \ldots, T_{i-1}\right) \text{ according to: } F(T_1 + T_2 + \ldots + T_{i-m-1}) -$$

$$S(T_{i-m-1}) P\left(X \text{ fails at } \sum_{l=1}^{i-m-2} T_l \bigg| T_1, \ldots, T_{i-1}\right) -$$

$$S(T_{i-m-1} + T_{i-m-2}) P\left(X \text{ fails at } \sum_{l=1}^{i-m-3} T_l \bigg| T_1, \ldots, T_{i-1}\right) -$$

$$\ldots - S(T_2 + T_3 + \ldots + T_{i-m-1}) F(T_1).$$

3. The apparatus of claim 2, wherein the modeling engine being configured to generate the SFM includes being configured to calculate $T_i$ according to:

$$T_i = \min(X, R_1, \ldots, R_{n-1}),$$

wherein X represents a random lifetime of the physical part, and R represents a corresponding residual lifetime of the physical part at each respective distinct location.

4. The apparatus of claim 2, wherein $$\frac{S(t+x)}{s(x)}$$

represents the lifetime distribution model, and application of the lifetime distribution model to the SFM includes application of an exponential distribution model according to the following:

$$\frac{S(t+x)}{S(x)} = \frac{e^{-\lambda(t+x)}}{e^{-\lambda x}}$$

wherein $\lambda$ represents a constant failure rate at any observed failure time.

5. The apparatus of claim 2, wherein $$\frac{S(t+x)}{s(x)}$$

represents the lifetime distribution model, and application of the lifetime distribution model to the SFM includes application of a Weibull distribution model according to the following:

$$\frac{S(t+x)}{S(x)} = \frac{e^{-[(t+x)/\alpha]^\beta}}{e^{-(x/\alpha)^\beta}}$$

wherein $\alpha$ and $\beta$ represent respectively a scale parameter and a shape parameter.

6. The apparatus of claim 1, wherein the modeling engine is further configured to at least:
   generate a scale parameter or shape parameter utilizing the lifetime distribution model; and
   determine upper and lower bounds of the lifetime distribution of the physical part based at least partially on the scale parameter or shape parameter, the maintenance interval being based at least partially on the upper and lower bounds of the lifetime distribution of the physical part.

7. A method for maintenance of a manufactured product composed of a plurality of physical parts including a multiple quantity of a physical part of the plurality of physical parts, the method comprising:

receiving failure data for the plurality of physical parts in which the failure data indicates individual instances of failure of at least two of the multiple quantity of the physical part, each of the at least two of the multiple quantity being located at a respective distinct location in the manufactured product;

generating a superimposed failure model (SFM) for the multiple quantity of the physical part based at least partially on the failure data, including determining a lifetime distribution of the physical part based at least partially on application of a lifetime distribution model to the SFM;

performing a maintenance activity for the physical part, including determining a maintenance interval for the physical part according to the lifetime distribution of the physical part; and removing or replacing the physical part based at least partially on the maintenance interval determined for the physical part.

8. The method of claim 7, wherein generating the SFM includes:

identifying an observed failure time for each of the individual instances of failure of the at least two of the multiple quantity of the physical part; and generating the SFM includes generating the SFM according to the following:

$$S(t) \cdot \left[ \sum_{m=1}^{i-1} \left( \frac{S\left(t + \sum_{k=1}^{m} T_{i-k}\right)}{S\left(\sum_{k=1}^{m} T_{i-k}\right)} \cdot P\left(X > \sum_{k=1}^{m} T_{i-k} | T_1, \ldots, T_{i-1}\right) \right) \right]^{n-1}$$

wherein t represents a given time, n represents the multiple quantity of the physical part, i represents an index for a sequence of observed failure times, x represents a given variable lifetime, S represents a survival function, $T_l$ represents an observed time interval between at least two observed failure times, and F(x) represents a distribution function of the physical part that indicates a probability that a lifetime of the physical part is less than x, and wherein generating the SFM includes calculating $$P\left(X > \sum_{k=1}^{m} T_{i-k} \bigg| T_1, \ldots, T_{i-1}\right) \text{ according to: } F(T_1 + T_2 + \ldots + T_{i-m-1}) -$$

$$S(T_{i-m-1}) P\left(X \text{ fails at } \sum_{l=1}^{i-m-2} T_l \bigg| T_1, \ldots, T_{i-1}\right) -$$

$$S(T_{i-m-1} + T_{i-m-2}) P\left(X \text{ fails at } \sum_{l=1}^{i-m-3} T_l \bigg| T_1, \ldots, T_{i-1}\right) -$$

$$\ldots - S(T_2 + T_3 + \ldots + T_{i-m-1}) F(T_1).$$

9. The method of claim 8, wherein generating the SFM includes being configured to calculate $T_i$ according to:

$$T_i = \min(X, R_1, \ldots, R_{n-1}),$$

wherein X represents a random lifetime of the physical part, and R represents a corresponding residual lifetime of the physical part at each respective distinct location.

10. The method of claim 8, wherein $$\frac{S(t+x)}{s(x)}$$

represents the lifetime distribution model, and application of the lifetime distribution model to the SFM includes application of an exponential distribution model according to the following:

$$\frac{S(t+x)}{S(x)} = \frac{e^{-\lambda(t+x)}}{e^{-\lambda x}}$$

wherein λ represents a constant failure rate at any distinct failure time (t).

11. The method of claim 8, wherein $$\frac{S(t+x)}{s(x)}$$

represents the lifetime distribution model, and application of the lifetime distribution model to the SFM includes application of a Weibull distribution model according to the following:

$$\frac{S(t+x)}{S(x)} = \frac{e^{-[(t+x)/\alpha]^\beta}}{e^{-(x/\alpha)^\beta}}$$

wherein α and β represent respectively a scale parameter and a shape parameter.

12. The method of claim 7 further comprising:

generating a scale parameter or shape parameter utilizing the lifetime distribution model; and determining upper and lower bounds of the lifetime distribution of the physical part based at least partially on the scale parameter or shape parameter, the maintenance interval being based at least partially on the upper and lower bounds of the lifetime distribution of the physical part.

13. A computer-readable storage medium for maintenance of a manufactured product composed of a plurality of physical parts including a multiple quantity of a physical part of the plurality of physical parts, the computer-readable storage medium having computer-readable program code stored therein that, in response to execution by a processor, cause an apparatus to at least:

receive failure data for the plurality of physical parts in which the failure data indicates individual instances of failure of at least two of the multiple quantity of the physical part, each of the at least two of the multiple quantity being located at a respective distinct location in the manufactured product;

generate a superimposed failure model (SFM) for the multiple quantity of the physical part based at least partially on the failure data, including determining a lifetime distribution of the physical part based at least partially on application of a lifetime distribution model to the SFM;

perform a maintenance activity for the physical part, including determining a maintenance interval for the physical part according to the lifetime distribution of the physical part; and automatically schedule the physical part for removal or replacement based at least partially on the maintenance interval determined for the physical part; and communicate the schedule to a user.

14. The computer-readable storage medium of claim 13, wherein the apparatus being caused to generate the SFM includes being caused to:
   identify an observed failure time for each of the individual instances of failure of the at least two of the multiple quantity of the physical part; and
   generate the SFM according to the following:

$$S(t) \cdot \left[ \sum_{m=1}^{i-1} \left( \frac{S\left(t + \sum_{k=1}^{m} T_{i-k}\right)}{S\left(\sum_{k=1}^{m} T_{i-k}\right)} \cdot P\left(X > \sum_{k=1}^{m} T_{i-k} | T_1, \ldots, T_{i-1}\right) \right) \right]^{n-1}$$

wherein t represents a given time, n represents the multiple quantity of the physical part, i represents an index for a sequence of observed failure times, x represents a given variable lifetime, S represents a survival function, $T_i$ represents an observed time interval between at least two observed failure times, and F(x) represents a distribution function of the physical part that indicates a probability that a lifetime of the physical part is less than x, and wherein the apparatus being caused to generate the SFM includes being caused to calculate $$P\left(X > \sum_{k=1}^{m} T_{i-k} \bigg| T_1, \ldots, T_{i-1}\right) \text{ according to: } F(T_1 + T_2 + \ldots + T_{i-m-1}) -$$

$$S(T_{i-m-1}) P\left(X \text{ fails at } \sum_{l=1}^{i-m-2} T_l \bigg| T_1, \ldots, T_{i-1}\right) -$$

$$S(T_{i-m-1} + T_{i-m-2}) P\left(X \text{ fails at } \sum_{l=1}^{i-m-3} T_l \bigg| T_1, \ldots, T_{i-1}\right) -$$

$$\ldots - S(T_2 + T_3 + \ldots + T_{i-m-1}) F(T_1).$$

15. The computer-readable storage medium of claim 14, wherein the apparatus being caused to generate the SFM includes being caused to calculate $T_i$ according to:

$T_i = \min(X, R_1, \ldots, R_{n-1})$, wherein X represents a random lifetime of the physical part, and R represents a corresponding residual lifetime of the physical part at each respective distinct location.

16. The computer-readable storage medium of claim 14, wherein $$\frac{S(t+x)}{S(x)} = \frac{e^{-\lambda(t+x)}}{e^{-\lambda x}}$$

represents the lifetime distribution model, and application of the lifetime distribution model to the SFM includes application of an exponential distribution model according to the following:

$$\frac{S(t+x)}{s(x)}$$

wherein λ represents a constant failure rate at any distinct failure time (t).

17. The computer-readable storage medium of claim 14, wherein $$\frac{S(t+x)}{s(x)}$$

represents the lifetime distribution model, and application of the lifetime distribution model to the SFM includes application of a Weibull distribution model according to the following:

$$\frac{S(t+x)}{S(x)} = \frac{e^{-[(t+x)/\alpha]^\beta}}{e^{-(x/\alpha)^\beta}}$$

wherein α and β represent respectively a scale parameter and a shape parameter.

18. The computer-readable storage medium of claim 13, the apparatus being further caused to:
   generate a scale parameter or shape parameter utilizing the lifetime distribution model; and
   determine upper and lower bounds of the lifetime distribution of the physical part based at least partially on the scale parameter or shape parameter, the maintenance interval being based at least partially on the upper and lower bounds of the lifetime distribution of the physical part.

* * * * *